(12) United States Patent
Imase

(10) Patent No.: US 10,712,685 B2
(45) Date of Patent: Jul. 14, 2020

(54) DEVELOPING ROLLER AND METHOD OF PRODUCING THE SAME

(71) Applicant: SUMITOMO RUBBER INDUSTRIES, LTD., Hyogo (JP)

(72) Inventor: Yuta Imase, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 0 days.

(21) Appl. No.: 16/398,182

(22) Filed: Apr. 29, 2019

(65) Prior Publication Data

US 2019/0361371 A1 Nov. 28, 2019

(30) Foreign Application Priority Data

May 28, 2018 (JP) ................................. 2018-101691

(51) Int. Cl.
*G03G 15/08* (2006.01)
*B23K 26/352* (2014.01)
*B23K 26/402* (2014.01)

(52) U.S. Cl.
CPC ....... *G03G 15/0818* (2013.01); *B23K 26/355* (2018.08); *B23K 26/402* (2013.01); *G03G 2215/0861* (2013.01); *G03G 2215/0863* (2013.01)

(58) Field of Classification Search
CPC ....... G03G 15/0818; G03G 2215/0861; G03G 2215/0863; B23K 26/355; B23K 26/402
See application file for complete search history.

(56) References Cited

U.S. PATENT DOCUMENTS

| 7,321,745 | B2 * | 1/2008 | Kawano | G03G 15/0808 399/281 |
| 7,356,294 | B2 * | 4/2008 | Ishida | G03G 15/0233 399/286 |
| 8,135,316 | B2 * | 3/2012 | Kojima | G03G 15/0818 399/276 |

FOREIGN PATENT DOCUMENTS

JP 2017107147 6/2017

* cited by examiner

*Primary Examiner* — Gregory H Curran
(74) *Attorney, Agent, or Firm* — JCIPRNET

(57) ABSTRACT

There are provided a developing roller having no risks of the image density of formed images rapidly decreasing and the occurrence of an uneven density since a toner transportation amount does not decrease greatly even if image formation is repeated, and a method of producing the same. In a developing roller, a plurality of recesses are disposed on an outer circumferential surface of a roller main body so that a ratio $P_A/P_C$ of a pitch $P_A$ in an axial direction on the outer circumferential surface to a pitch $P_C$ in a circumferential direction is set to a range exceeding 1.1. The production method includes a process of forming the recesses on the outer circumferential surface by laser processing.

5 Claims, 3 Drawing Sheets

DEVELOPING ROLLER AND METHOD OF PRODUCING THE SAME

CROSS-REFERENCE TO RELATED APPLICATION

This application claims the priority of Japan patent application serial no. 2018-101691, filed on May 28, 2018. The entirety of the above-mentioned patent application is hereby incorporated by reference herein and made a part of this specification.

BACKGROUND

Technical Field

The disclosure relates to a developing roller that is used by being incorporated into an image forming device using electrophotography and a method of producing the same.

Description of Related Art

For example, in image forming devices using electrophotography such as laser printers, electrostatic copying machines, plain paper facsimile machines, and a multifunctional machine thereof, developing rollers are used to develop an electrostatic latent image formed on the surface of a photoreceptor into a toner image.

As the developing roller, for example, a developing roller including a roller main body formed by molding a rubber composition into a cylindrical shape and performing crosslinking and a shaft which is made of a metal or the like and is inserted and fixed to a through-hole at the center of the roller main body is used.

In development using a developing roller, while a tip of a quantity regulating blade (charging blade) is in contact with the outer circumferential surface of the roller main body within a developing unit in which a toner is accommodated of the image forming device, the developing roller is rotated.

Then, the toner is charged and adheres to the outer circumferential surface of the roller main body, and an adhesion amount thereof is regulated when passing through a nip part between the outer circumferential surface of the roller main body and the tip of the quantity regulating blade, and thereby a toner layer is formed on the outer circumferential surface.

In addition, concurrently, the surface of the photoreceptor is uniformly changed and then exposed, and thereby an electrostatic latent image is formed.

Next, when the developing roller is additionally rotated in this state, and the toner layer is transported to the vicinity of the surface of the photoreceptor, the toner forming the toner layer is selectively moved to the surface of the photoreceptor according to an electrostatic latent image formed on the surface of the photoreceptor, and the electrostatic latent image is developed into a toner image.

For example, in order to control electrostatic properties and a transportation amount of the toner, the outer circumferential surface of the roller main body is polished so that it has a predetermined surface roughness, and after polishing, generally, a surface state is adjusted by a coating film being applied in order to reduce a polished texture which is minute irregularities.

However, since the coating film is formed by applying a liquid coating agent forming the coating film to the outer circumferential surface of the roller main body according to a coating method such as a spray method and a dipping method, and then drying it, defects such as foreign substances such as dust mixed in during a forming process and the occurrence of an irregular thickness are likely to occur.

In addition, an organic solvent is necessary to prepare the coating agent. However, when an organic solvent is used, an environmental burden increases, and this is contrary to the current trend of reducing volatile organic compounds (VOC).

Then, research in which, in place of a coating film, the outer circumferential surface of the roller main body after polishing is subjected to laser processing, and a plurality of recesses are formed on the outer circumferential surface has been studied (refer to Patent Document 1 and the like).

The plurality of recesses are disposed in the axial direction and the circumferential direction of the outer circumferential surface, and are formed so that adjacent recesses overlap in at least one direction between the two directions.

Specifically, while an irradiation level of a laser focused on the opening shape of the recesses is set so that irradiation ranges overlap each other in at least one direction between the circumferential direction and the axial direction and an output of the laser is adjusted, light is emitted to the outer circumferential surface of the roller main body while scanning in the two directions.

Then, the rubber forming the outer circumferential surface is melted due to the heat of irradiation and a polished texture is damaged, and at least a part of the crosslinked product is evaporated and recesses are formed.

In addition, a state in which the rubber between adjacent recesses is melted, and they are connected with a continuously smooth curved surface so that no edges are formed together with the inside of the recesses is brought about.

Therefore, various problems with respect to the outer circumferential surface of the roller main body occurring when a coating film is formed simply by emitting a laser are not caused, and it has a state in which a polished texture which is minute irregularities is reduced and larger irregularities (undulation) due to the plurality of recesses are formed.

As a result, it is possible to obtain a developing roller through which it is possible to electrically uniformize the outer circumferential surface of a roller main body and adjust the surface roughness, and particularly in an initial stage of use, a sufficient amount of a toner is transported to a photoreceptor, and thus an image having high image density and without an uneven density can be formed.

[Patent Document 1] Japanese Patent Laid-Open No. 2017-107147

Incidentally, according to studies performed by the inventors, in the developing roller of the related art in which a plurality of recesses are disposed on the outer circumferential surface of the roller main body by laser processing, when image formation is repeated, a decrease in the toner transportation amount tends to be larger.

Then, when the toner transportation amount greatly decreases, the image density of formed images rapidly decreases, and an uneven density tends to occur in some cases.

The disclosure provides a developing roller having no risks of the image density of formed images rapidly decreasing and the occurrence of an uneven density since a toner transportation amount does not decrease greatly even if image formation is repeated, and a method of producing the same.

SUMMARY

According to an embodiment of the disclosure, there is provided a developing roller having a roller main body, wherein, on an outer circumferential surface of the roller main body, a plurality of recesses that are disposed at predetermined pitches in a circumferential direction and an axial direction in the outer circumferential surface are provided, and a pitch $P_A$ between the plurality of recesses in the axial direction and a pitch $P_C$ in the circumferential direction satisfy Formula (1):

$$P_A/P_C>1.1 \qquad (1).$$

In addition, according to an embodiment of the disclosure, there is provided a method of producing the developing roller of the disclosure, including a process of forming the plurality of recesses on the outer circumferential surface of the roller main body by laser processing.

DESCRIPTION OF THE EMBODIMENTS

Figure 1A:
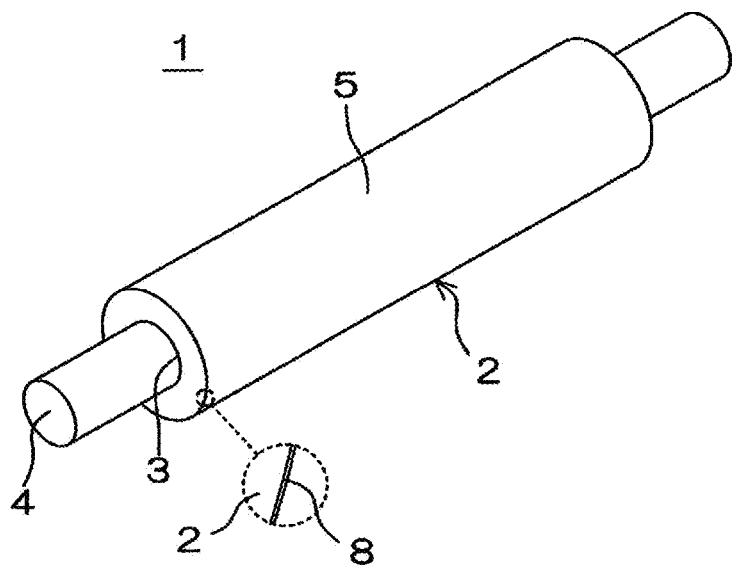
FIG. 1A is a perspective view showing an example of a developing roller according to an embodiment of the disclosure.

According to the disclosure, it is possible to provide a developing roller having no risks of the image density of formed images rapidly decreasing and the occurrence of an uneven density since a toner transportation amount does not decrease greatly even if image formation is repeated, and a method of producing the same.

The reason why the above problems occur in the developing roller of the related art is that, when a plurality of recesses disposed in the axial direction and the circumferential direction are formed on the outer circumferential surface of the roller main body, there is a difference in sizes of irregularities (undulations) disposed on the outer circumferential surface in the axial direction and the circumferential direction in respective directions.

Here, in the following, the size of the irregularities will be defined by a difference in the height between the lowest point inside each of the recesses disposed on the outer circumferential surface, for example, the lowest point along a line connecting the center points of circles in the axial direction or the circumferential direction if the recesses have a circular opening shape, and the highest point of the protrusions between adjacent recesses.

According to studies performed by the inventors, when the sizes of the irregularities are substantially the same in the axial direction and the circumferential direction of the outer circumferential surface of the roller main body, or the size in the circumferential direction is larger than the size in the axial direction, a toner transportation amount greatly decreases when image formation is repeated.

Then, the image density of formed images rapidly decreases and an uneven density occurs.

The size of the irregularities in the axial direction and the circumferential direction can be defined by a ratio $P_A/P_C$ of a pitch $P_A$ between a plurality of recesses disposed on the outer circumferential surface in the axial direction to a pitch $P_C$ thereof in the circumferential direction. In the developing roller of the related art, the ratio $P_A/P_C$ is 1.1 or less.

On the other hand, in the disclosure, the ratio $P_A/P_C$ is set to a range in which Formula (1) is satisfied as described above, that is, a range exceeding 1.1, and the size of the irregularities disposed on the outer circumferential surface of the roller main body is larger in the axial direction than in the circumferential direction.

Therefore, even if image formation is repeated, it is possible to prevent a large decrease in the toner transportation amount, and it is possible to make formation of a favorable image having a high image density and without density unevenness last for a longer time.

This can be clearly understood from the results of examples and comparative examples to be described below.

Here, in order to further improve the above effects, the ratio $P_A/P_C$ is preferably 1.2 or more, and particularly 1.3 or more within the above range.

In addition, the ratio $P_A/P_C$ is preferably 1.6 or less, and particularly 1.5 or less within the above range.

Since the pitch $P_A$ in the axial direction is large, when the ratio $P_A/P_C$ exceeds the above range, intervals between recesses adjacent to each other in the axial direction are excessively large, and a gap between the recesses may not be formed in a state in which they are connected with a continuously smooth curved surface by laser processing.

Then, a polished surface not subjected to laser processing is exposed between recesses adjacent to each other in the axial direction, and edges may occur at a boundary between the recess and the polished surface, and may influence the image quality of formed images.

On the other hand, in order to reduce the pitch $P_C$ in the circumferential direction and set the ratio $P_A/P_C$ to a value exceeding the above range, a plurality of recesses of a number greater than necessary need to be formed in the circumferential direction.

Thereby, for example, when recesses are formed by laser processing, the number of laser emitting points increases and the time and energy necessary for laser processing increase, and as a result, the productivity for the developing rollers may decrease.

On the other hand, when the ratio $P_A/P_C$ is set to the above range or less, it is possible to further improve the above effects of the disclosure while minimizing the occurrence of such problems.

Incidentally, in paragraphs [0041] to [0044] and FIG. 13 and FIG. 14 in Patent Document 1, it is described that, when a laser is emitted while scanning in the circumferential direction, recesses are formed in groove shapes that are continuous in the circumferential direction, and thus the number of laser emitting points is reduced, and thereby the productivity is improved.

However, when a plurality of groove-shaped recesses continuous in the circumferential direction are formed adjacent to each other in the axial direction, as shown in FIG. 13 in Patent Document 1, the outer circumferential surface of the roller main body has a surface state in which a plurality of recesses and protrusions between recesses adjacent to each other in the axial direction are clearly separated.

Therefore, there is a problem that such a surface state is also reflected in the formed image, which is likely to cause image defects.

Here, a specific range of the pitch $P_A$ in the axial direction and the pitch $P_C$ in the circumferential direction which define the ratio $P_A/P_C$ is not particularly limited.

However, in order to form an image with favorable image quality and the like, pitches $P_A$ and $P_C$ of a recess 6 are preferably 30 μm or more and preferably 60 μm or less in any direction.

In addition, for example, when recesses are formed by laser processing, regarding laser irradiation ranges, an irradiation level and an output of the laser are preferably set so that adjacent irradiation ranges overlap each other when an irradiation position is scanned at pitches matching the pitches $P_A$ and $P_C$.

Therefore, a state in which the rubber between adjacent recesses formed on the outer circumferential surface of the roller main body is melted and these are connected with a continuous smooth curved surface so that no edges are formed together with the inside of the recesses is brought about, and an image with favorable image quality can be formed.

<<Developing Roller and Method of Producing the Same>>

Figure 1B:
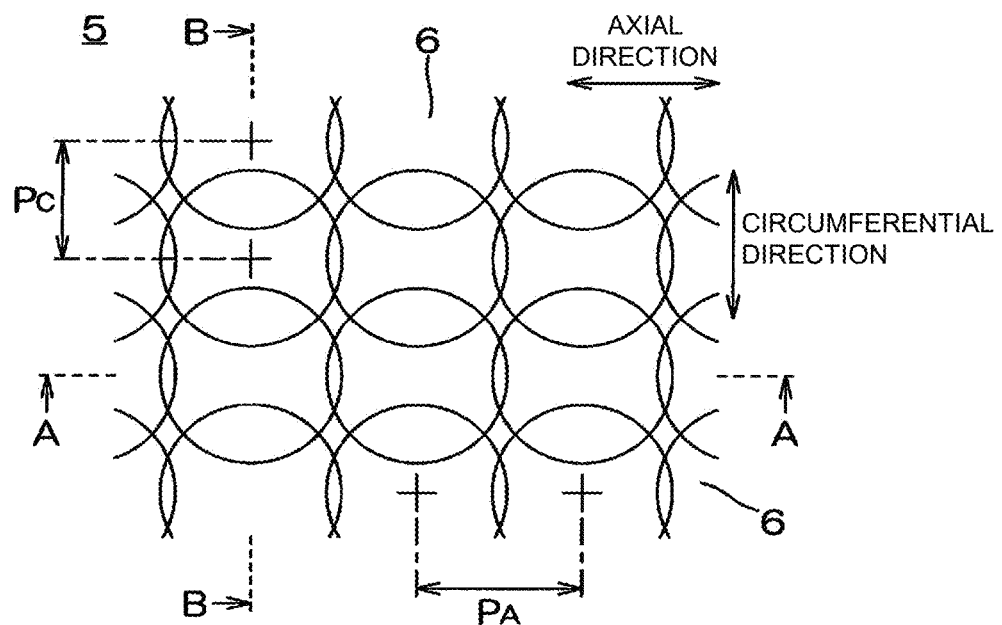
FIG. 1B is a diagram explaining an example of a disposition of recesses formed on the outer circumferential surface of a roller main body of the developing roller of the example of FIG. 1A.

FIG. 1A is a perspective view showing an example of a developing roller according to an embodiment of the disclosure, and FIG. 1B is a diagram explaining an example of a disposition of recesses formed on an outer circumferential surface of a roller main body of the developing roller of the example of FIG. 1A.

Figure 2A:
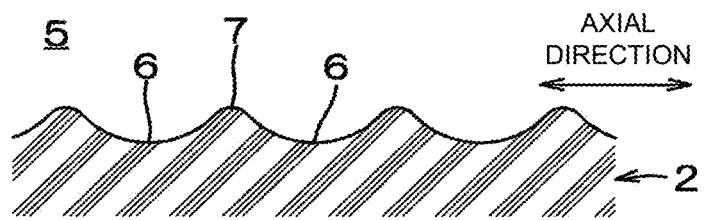
FIG. 2A is a cross-sectional view taken along the line A-A in FIG. 1B.
Figure 2B:
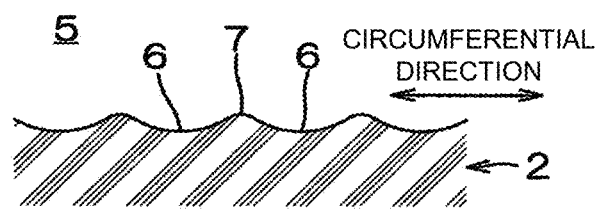
FIG. 2B is a cross-sectional view taken along the line B-B in FIG. 1B.

In addition, FIG. 2A is a cross-sectional view taken along the line A-A in FIG. 1B, and FIG. 2B is a cross-sectional view taken along the line B-B in FIG. 1B.

With reference to FIG. 1A, a developing roller 1 of this example includes a roller main body 2 which is formed into a nonporous and single-layer cylindrical shape using a rubber composition to which semiconductivity is imparted.

A shaft 4 is inserted into and fixed to a through-hole 3 at the center of the roller main body 2.

The shaft 4 is integrally formed of a highly conductive material, for example, a metal such as iron, aluminum, an aluminum alloy, or stainless steel.

For example, the shaft 4 having an outer diameter larger than the inner diameter of the through-hole 3 is press-fitted into the through-hole 3, and thus electrically connected and mechanically fixed to the roller main body 2.

In addition, the shaft 4 is electrically connected and mechanically fixed to the roller main body 2 using an adhesive having conductivity.

Alternatively, using both methods together, the shaft 4 may be electrically connected and mechanically fixed to the roller main body 2.

With reference to FIG. 1B, on an outer circumferential surface 5 of the roller main body 2, a plurality of recesses 6 having a circular opening shape indicated by a solid line in the drawing are formed.

As described above, for example, the recesses 6 are formed by emitting a laser focused in a circle according to the opening shape of the recess 6 to the outer circumferential surface 5, thus selectively melting the rubber forming the outer circumferential surface 5, and evaporating at least a part thereof.

The recesses 6 are formed in a matrix array in the axial direction and the circumferential direction of the outer circumferential surface 5, and the recesses 6 are formed so that they overlap each other in the axial direction and the circumferential direction.

In the case of the example in the drawing, the pitch $P_A$ between the recesses 6 adjacent in the axial direction, which is a distance between centers of circles, is made constant, and the recesses 6 are disposed at equal intervals in the axial direction.

In addition, in the case of the example in the drawing, the pitch $P_C$ between the recesses 6 adjacent in the circumferential direction, which is a distance between centers of circles, is made constant, and the recesses 6 are disposed at equal intervals in the circumferential direction.

In addition, as described above, the pitch $P_A$ in the axial direction and the pitch $P_C$ in the circumferential direction are set to be a range that satisfies Formula (1):

$$P_A/P_C > 1.1 \tag{1}$$

In addition, according to this setting, the size of the irregularities constituted by the recesses 6 adjacent to each other in axial direction and a protrusion 7 therebetween shown in FIG. 2A is larger than the size of the irregularities constituted by the recesses 6 adjacent to each other in the circumferential direction and a protrusion 7 therebetween shown in FIG. 2B.

Therefore, according to the developing roller 1 in the example of FIGS. 1A and 1B, which has the roller main body 2 with the outer circumferential surface 5 on which the recesses 6 are formed, even if image formation is repeated, it is possible to prevent a large decrease in the toner transportation amount.

As a result, it is possible to continuously form a favorable image with high image density and without an uneven density for a longer time.

As shown in the enlarged part in FIG. 1A, an oxide film 8 may be formed on the outer circumferential surface 5 of the roller main body 2.

When the oxide film 8 is formed, the oxide film 8 functions as a dielectric layer, and a dielectric loss tangent of the developing roller 1 can be reduced.

In addition, when the oxide film 8 has a low-friction layer, it is possible to minimize adhesion to the toner.

Moreover, since the oxide film 8 can be easily formed, for example, by simply emitting ultraviolet rays to the outer circumferential surface 5 in an oxidizing atmosphere and oxidizing the rubber in the vicinity of the outer circumferential surface 5, it is possible to minimize a decrease in the productivity for the developing roller 1 and an increase in production costs.

However, the oxide film 8 may be not formed.

Here, the "single-layer structure" of the roller main body 2 means that the number of layers made of a rubber or the like is one, and the oxide film 8 formed by emitting ultraviolet rays or the like is not included in the number of layers.

In order to produce the developing roller 1, first a predetermined rubber composition is prepared, and the prepared rubber composition is extruded and molded into a cylindrical shape using an extruder, cut to a predetermined length, pressurized and heated in a vulcanizer to crosslink rubbers.

Next, the crosslinked cylindrical component is heated using an oven or the like and subjected to secondary crosslinking, and is cooled, and the outer circumferential surface 5 is then polished to obtain a predetermined outer diameter, and the roller main body 2 is formed.

Regarding the polishing method, various polishing methods, for example, dry traverse polishing, can be used.

The shaft 4 can be inserted and fixed to the through-hole 3 at any point from after the cylindrical component is cut until after polishing. However, after cutting, secondary crosslinking and polishing are preferably performed first while the shaft 4 is inserted into the through-hole 3.

Therefore, it is possible to minimize warping and deformation of the roller main body 2 due to expansion and contraction during secondary crosslinking. In addition, when polishing is performed while rotating around the shaft 4, it is possible to improve workability of the polishing and minimize deflection of the outer circumferential surface 5.

As described above, the shaft 4 having an outer diameter larger than the inner diameter of the through-hole 3 is press-fitted into the through-hole 3, or may be inserted into the through-hole 3 of the cylindrical component before secondary crosslinking using a thermosetting adhesive having conductivity.

In the former case, the shaft 4 is press-fitted, and at the same time, electrical connection and mechanical fixing to the roller main body 2 are completed.

In addition, in the latter case, a cylindrical component is subjected to secondary crosslinking due to heating in an oven and, and at the same time, a thermosetting adhesive is cured, and the shaft 4 is electrically connected and mechanically fixed to the roller main body 2.

In addition, as described above, using both methods together, the shaft 4 may be electrically connected and mechanically fixed to the roller main body 2.

Next, the polished outer circumferential surface 5 is subjected to laser processing, and the plurality of recesses 6 are formed in a matrix array in the axial direction and the circumferential direction of the outer circumferential surface 5 at the pitches $P_A$ and $P_C$ that satisfy the above Formula (1).

Laser processing is performed by, for example, emitting a laser with a predetermined output limited to a predetermined irradiation level to the outer circumferential surface 5 after polishing while moving the irradiation position at the pitches $P_A$ and $P_C$.

As described above, the oxide film 8 is preferably formed on the outer circumferential surface 5 of the roller main body 2 by emitting ultraviolet rays.

That is, when ultraviolet rays with a predetermined wavelength are emitted to the outer circumferential surface 5 of the roller main body 2 in an oxidizing atmosphere for a predetermined time, and a diene rubber in the rubber composition constituting the vicinity of the outer circumferential surface 5 is oxidized, the oxide film 8 can be formed.

Therefore, the process of forming the oxide film 8 is simple and efficient, and it is possible to minimize a decrease in the productivity for the developing roller 1 and an increase in the production costs.

In addition, the oxide film 8 formed by emitting ultraviolet rays does not cause problems, for example, as in a coating film formed by applying a coating agent, and has excellent thickness uniformity and adhesion to the roller main body 2, and the like.

The wavelength of ultraviolet rays emitted is preferably 100 nm or more and preferably 400 nm or less, particularly 300 nm or less in order to oxidize a diene rubber in the rubber composition with high efficiency and form the oxide film 8 having the excellent functions described above.

In addition, the irradiation time is preferably 30 seconds or longer, particularly 1 minute or longer, and preferably 30 minutes or shorter, particularly 20 minutes or shorter.

However, the oxide film 8 may be formed by other methods and may be not formed.

<<Rubber Composition>>

A rubber composition forming a roller main body is prepared by adding a crosslinking component for crosslinking rubbers and various additives to the rubber.

In order to impart conductivity to the rubber composition and adjust the roller resistance value of the developing roller to a suitable range, a rubber composition having ion conductivity will be described below. However, as the rubber composition, any of rubber compositions having ion conductivity and electron conductivity may be used.

<Rubber>

As described above, in order to impart ion conductivity to the rubber composition, an ion-conducting rubber is preferably used as the rubber.

In addition, regarding the rubber, it is preferable to use an ion-conducting rubber and a diene rubber and/or an ethylene propylene rubber in combination.

When these rubbers are used in combination, favorable processability can be imparted to the rubber composition, and it is possible to improve the mechanical strength, durability and the like of the roller main body.

In addition, it is possible for the rubber to impart favorable characteristics to the roller main body, that is, characteristics in which it is flexible, a compression set is small, and deformation is unlikely to occur.

(Ion-Conducting Rubber)

Examples of the ion-conducting rubber include an epichlorohydrin rubber and a polyether rubber.

Among these, examples of the epichlorohydrin rubber include an epichlorohydrin homopolymer, an epichlorohydrin-ethylene oxide binary copolymer (ECO), an epichlorohydrin-propylene oxide binary copolymer, an epichlorohydrin-allyl glycidyl ether binary copolymer, an epichlorohydrin-ethylene oxide-allyl glycidyl ether terpolymer (GECO), an epichlorohydrin-propylene oxide-allyl glycidyl ether terpolymer, and an epichlorohydrin-ethylene oxide-propylene oxide-allyl glycidyl ether quaternary copolymer.

In addition, examples of the polyether rubber include an ethylene oxide-allyl glycidyl ether binary copolymer, and an ethylene oxide-propylene oxide-allyl glycidyl ether ternary copolymer.

Among these, a copolymer containing ethylene oxide, particularly, ECO and/or GECO is preferable.

Contents of ethylene oxide in ECO and/or GECO are both preferably 30 mol % or more, particularly 50 mol % or more, and preferably 80 mol % or less.

Ethylene oxide has an effect of lowering a roller resistance value of the developing roller.

However, when the content of ethylene oxide is below the above range, since the above effect is not obtained sufficiently, the roller resistance value of the developing roller may not be sufficiently lowered.

On the other hand, when the content of ethylene oxide exceeds the above range, crystallization of ethylene oxide occurs, and segment movement of a molecular chain is inhibited, and thus a roller resistance value of the developing roller tends to increase contrarily.

In addition, the roller main body after crosslinking may then become too hard, the viscosity of the rubber composition before crosslinking may increase during heating and melting, and the processability of the rubber composition may deteriorate in some cases.

A content of epichlorohydrin in ECO is the remaining amount of the ethylene oxide content.

That is, the content of epichlorohydrin is preferably 20 mol % or more, and preferably 70 mol % or less, and particularly 50 mol % or less.

In addition, the content of allyl glycidyl ether in GECO is preferably 0.5 mol % or more, particularly 2 mol % or more, and preferably 10 mol % or less, particularly 5 mol % or less.

Allyl glycidyl ether itself functions as a side chain to secure a free volume, and thereby minimizes crystallization of ethylene oxide, and thus has an effect of lowering a roller resistance value of the developing roller.

However, when the content of allyl glycidyl ether is below the above range, since such an effect may not be obtained sufficiently, the roller resistance value of the developing roller may not be sufficiently lowered.

On the other hand, allyl glycidyl ether functions as a crosslinking point when GECO is crosslinked.

Therefore, when the content of allyl glycidyl ether exceeds the above range, a crosslinking density of GECO becomes too high, and thus segment movement of a molecular chain is inhibited, and thereby the roller resistance value of the developing roller tends to increase contrarily.

A content of epichlorohydrin in GECO is the amount remaining after the ethylene oxide content and the allyl glycidyl ether content.

That is, the content of epichlorohydrin is preferably 10 mol % or more, particularly 19.5 mol % or more, and preferably 69.5 mol % or less, particularly 60 mol % or less.

Here, regarding the GECO, in addition to the copolymer in which three types of monomers are copolymerized described above in a narrow sense, a modified component obtained by modifying an epichlorohydrin-ethylene oxide copolymer (ECO) with allyl glycidyl ether is known.

In the disclosure, any of such GECOs can be used.

One, two, or more types of such an ion-conducting rubbers can be used.

(Diene Rubber)

Examples of the diene rubber include a natural rubber, isoprene rubber (IR), acrylonitrile butadiene rubber (NBR), styrene butadiene rubber (SBR), butadiene rubber (BR), and chloroprene rubber (CR).

Particularly, regarding the diene rubber, it is preferable to use two types of NBRs and CRs in combination.

However, two or more types of both rubbers may be used in combination.

NBR

Since a solubility parameter (SP value) of NBR is close to that of an ion-conducting rubber such as epichlorohydrin rubber, and CR, NBR assists fine dispersion between rubbers as a so-called compatibilizer for such rubbers, and functions to improve the integrity of the rubber composition.

Then, it functions to increase fluidity when the rubber composition is heated, secure favorable moldability even if no softening agent is added, improve the flexibility of the roller main body after molding and crosslinking, and increase image durability of the developing roller.

The image durability is an index indicating how long the image quality of formed images can be favorably maintained by minimizing deterioration of the toner when the same toner is repeatedly used for image formation.

That is, in one image formation, only a small part of the toner accommodated in the developing unit of the image forming device is used, and the remaining large part of the toner repeatedly circulates in the developing unit.

Therefore, an important key for improving the image durability is the extent to which the roller main body of the developing roller that repeatedly comes in contact with the toner provided in the developing unit damages the toner or does not damage the toner.

When the flexibility of the roller main body deteriorates and the image durability of the developing roller decreases, the image quality of the formed images tends to deteriorate.

In addition, in the developing roller, in order to improve the image durability, it is necessary to improve the flexibility of the roller main body.

In addition, NBR improves charging characteristics of particularly a positively chargeable toner, and NBR itself is a polar rubber so that it functions to finely adjust the roller resistance value of the developing roller.

In addition, NBR is oxidized when ultraviolet rays are emitted in an oxidizing atmosphere and functions as a material that forms an oxide film on the outer circumferential surface of the roller main body.

Regarding the NBR, any of low nitrile NBR having an acrylonitrile content of 24% or less, medium nitrile NBR having an acrylonitrile content of 25 to 30%, medium to high nitrile NBR having an acrylonitrile content of 31 to 35%, high nitrile NBR having an acrylonitrile content of 36 to 42%, and extremely high nitrile NBR having an acrylonitrile content of 43% or more can be used.

In addition, as NBR, there are an oil-extended type in which an extender oil is added to adjust the flexibility and a non-oil-extended type in which no extender oil is added. However, in the disclosure, in order to prevent contamination of the photoreceptor and the like, NBR of a non-oil-extended type not containing an extender oil which may serve as a bleeding material is preferably used.

One, two, or more types of such NBRs can be used.

CR

CR improves particularly the flexibility of the roller main body and functions to increase the image durability of the developing roller.

In addition, CR improves charging characteristics of particularly a positively chargeable toner, and CR itself is a polar rubber so that it functions to finely adjust the roller resistance value of the developing roller.

In addition, CR is also oxidized when ultraviolet rays are emitted in an oxidizing atmosphere and functions as a material that forms an oxide film on the outer circumferential surface of the roller main body.

For example, CRs are synthesized by emulsion polymerization of chloroprene, and are classified into sulfur-modified types and non-sulfur-modified types according to the type of the molecular weight adjusting agent for the synthesis.

Among these, the sulfur-modified type CR is synthesized by plasticizing a polymer obtained by copolymerizing chloroprene and sulfur as a molecular weight adjusting agent with thiuram disulfide or the like and adjusting the viscosity to a predetermined degree.

On the other hand, the non-sulfur-modified type CRs are classified into, for example, mercaptan-modified types, xanthogen-modified types, and the like.

Among these, the mercaptan-modified type CR is synthesized in the same manner as in the sulfur-modified type CR except that alkyl mercaptans such as n-dodecyl mercaptan, tert-dodecyl mercaptan, and octyl mercaptan are used as a molecular weight adjusting agent.

In addition, the xanthogen-modified type CR is synthesized in the same manner as in the sulfur-modified type CR except that an alkylxanthogen compound is used as a molecular weight adjusting agent.

In addition, CRs are classified into slow crystallization rate types, moderate crystallization rate types, and fast crystallization rate types based on its crystallization rate.

In the disclosure, any type of CR may be used. However, among these, non-sulfur-modified type and slow crystallization rate type CR is preferable.

In addition, regarding the CR, a copolymer rubber including chloroprene and another copolymer component may be used.

Examples of the other copolymer component include one, two, or more types from 2,3-dichloro-1,3-butadiene, 1-chloro-1,3-butadiene, styrene, acrylonitrile, methacrylonitrile, isoprene, butadiene, acrylic acid, acrylate ester, methacrylic acid, and methacrylic acid ester.

In addition, as CR, there are an oil-extended type in which an extender oil is also added to adjust the flexibility and a non-oil-extended type in which no extender oil is added. In the disclosure, in order to prevent contamination of the photoreceptor, a non-oil-extended type CR not containing an extender oil which may serve as a bleeding material is preferably used.

One, two or more types of such CRs can be used.

(Content)

The content of the ion-conducting rubber is preferably 50 parts by mass or more, particularly 55 parts by mass or more, and preferably 70 parts by mass or less, particularly 65 parts by mass or less with respect to 100 parts by mass of the total amount of rubbers.

The content of the diene rubber is the amount remaining after the ion-conducting rubber.

That is, the content of the diene rubber may be set so that the total amount of rubbers becomes 100 parts by mass when the content of the ion-conducting rubber is set to predetermined values within the above range.

When the content of the ion-conducting rubber is below the above range or exceeds the above range, in both cases, the roller resistance value of the developing roller cannot be adjusted to a range suitable for the developing roller.

In addition, when the content of the ion-conducting rubber exceeds the above range, the proportion of the diene rubber is relatively low, and it is not possible for the rubber to impart favorable characteristics described above to the roller main body in some cases.

On the other hand, when the content of the ion-conducting rubber is set to be within the above range, it is possible for the rubber to impart favorable characteristics to the roller main body while the roller resistance value of the developing roller is adjusted to a suitable range in some cases.

<Crosslinking Component>

Regarding the crosslinking component, a crosslinking agent for crosslinking rubbers and a crosslinking promoter for promoting crosslinking of rubbers using the crosslinking agent are preferably used in combination.

Among these, regarding the crosslinking agent, for example, a sulfur-based crosslinking agent, a thiourea-based crosslinking agent, a triazine derivative-based crosslinking agent, a peroxide-based crosslinking agent, various monomers, and the like may be used.

The crosslinking agent can be appropriately selected according to the type of rubber to be incorporated.

For example, when the rubber is a combination of GECO and a diene rubber both having sulfur crosslinking properties, the sulfur-based crosslinking agent may be used as the crosslinking agent.

In addition, for example, when the ion-conducting rubber is ECO having no sulfur crosslinking properties, the thiourea-based crosslinking agent for crosslinking ECO and the sulfur-based crosslinking agent for crosslinking the diene rubber may be used together as the crosslinking agent.

(Sulfur-Based Crosslinking Agent)

Examples of the sulfur-based crosslinking agent include sulfurs such as sulfur powder, oil-treated sulfur powder, precipitated sulfur, colloidal sulfur, and dispersible sulfur and an organic-sulfur-containing compound such as tetramethylthiuram disulfide and N,N-dithiobismorpholine. Particularly, sulfur is preferable.

In order for the rubber to impart favorable characteristics described above to the roller main body, the content of sulfur is preferably 0.5 parts by mass or more and preferably 2 parts by mass or less with respect to 100 parts by mass of the total amount of rubbers.

Here, for example, when oil-treated sulfur powder, dispersible sulfur, or the like is used as sulfur, the content is a proportion of sulfur itself as an active component contained therein.

In addition, when an organic-sulfur-containing compound is used as the crosslinking agent, the content is preferably adjusted so that the proportion of sulfur contained in molecules with respect to 100 parts by mass of the total amount of rubbers is within the above range.

(Crosslinking Promoter)

Examples of a crosslinking promoter for promoting crosslinking of rubbers using a sulfur-based crosslinking agent include one, two, or more types of a thiazole-based promoter, a thiuram-based promoter, a sulfenamide-based promoter, and a dithiocarbamate-based promoter.

Particularly, a combination of a thiuram-based promoter and a thiazole-based promoter is preferably used.

Examples of the thiuram-based promoter include one, two, or more types of tetramethylthiuram monosulfide, tetramethylthiuram disulfide, tetraethylthiuram disulfide, tetrabutylthiuram disulfide, and dipentamethylene thiuram tetrasulfide. Particularly, tetramethylthiuram monosulfide is preferable.

In addition, examples of the thiazole-based promoter include one, two, or more types of 2-mercaptobenzothiazole, di-2-benzothiazolyl disulfide, a zinc salt of 2-mercaptobenzothiazole, a cyclohexylamine salt of 2-mercaptobenzothiazole, and 2-(4'-morpholinodithio)benzothiazole. Particularly, di-2-benzothiazolyl disulfide is preferable.

In a system using the above two types of crosslinking promoters in combination, in order to exhibit such an effect of promoting crosslinking of rubbers using a sulfur-based crosslinking agent sufficiently, the content of the thiuram-based promoter is preferably 0.3 parts by mass or more and 3 parts by mass or less with respect to 100 parts by mass of the total amount of rubbers. In addition, the content of the thiazole-based promoter is preferably 0.3 parts by mass or more and 3 parts by mass or less with respect to 100 parts by mass of the total amount of rubbers.

(Thiourea-Based Crosslinking Agent)

Regarding the thiourea-based crosslinking agent, various thiourea compounds that have a thiourea structure in the molecule and can function as a crosslinking agent for ECO can be used. Examples of the thiourea-based crosslinking agent include one, two, or more types of ethylene thiourea, N,N'-diphenylthiourea, trimethylthiourea, a thiourea represented by Formula (2):

$$(C_nH_{2n+1}NH)_2C=S \qquad (2),$$

[where, n is an integer of 1 to 12], tetramethylthiourea, and the like. Particularly, ethylene thiourea is preferable.

In order for the rubber to impart favorable characteristics described above to the roller main body, the content of the thiourea-based crosslinking agent is preferably 0.3 parts by mass or more and preferably 1 part by mass or less with respect to 100 parts by mass of the total amount of rubbers.

(Crosslinking Promoter)

Various crosslinking promoters that promote a crosslinking reaction of ECO using the thiourea-based crosslinking agent can be used in combination with the thiourea-based crosslinking agent.

Examples of the crosslinking promoter include one, two, or more types of guanidine-based promoters such as 1,3-diphenylguanidine, 1,3-di-o-tolylguanidine, and 1-o-tolyl biguanide. Particularly, 1,3-di-o-tolylguanidine is preferable.

In order to exhibit such an effect of promoting a crosslinking reaction sufficiently, the content of the crosslinking promoter is preferably 0.3 parts by mass or more and preferably 1 part by mass or less with respect to 100 parts by mass of the total amount of rubbers.

<Conductive Agent>

A salt (ionic salt) of an anion having a fluoro group and a sulfonyl group in the molecule and a cation may be additionally added as a conductive agent for ion conductivity to the rubber composition.

When the ionic salt as a conductive agent is added, it is possible to further improve ion conductivity of the rubber composition and it is possible to further reduce the roller resistance value of the developing roller.

Examples of the anion having a fluoro group and a sulfonyl group in the molecule constituting the ionic salt include one, two, or more types of fluoroalkyl sulfonic acid ions, bis(fluoroalkylsulfonyl)imide ions, and tris(fluoroalkylsulfonyl)methide ions.

Among these, examples of the fluoroalkyl sulfonic acid ions include one, two, or more types of $CF_3SO_3-$, and $C_4F_9SO_3-$.

In addition, examples of the bis(fluoroalkylsulfonyl)imide ions include one, two, or more types of $(CF_3SO_2)_2N-$, $(C_2F_5SO_2)_2N-$, $(C_4F_9SO_2)(CF_3SO_2)N-$, $(FSO_2C_6F_4)(CF_3SO_2)N-$, $(C_8F_{17}SO_2)(CF_3SO_2)N-$, $(CF_3CH_2OSO_2)_2N-$, $(CF_3CF_2CH_2OSO_2)_2N-$, $(HCF_2CF_2CH_2OSO_2)_2N-$, and $[(CF_3)_2CHOSO_2]_2N-$.

In addition, examples of the tris(fluoroalkylsulfonyl)methide ions include one, two, or more types of $(CF_3SO_2)_3C-$, and $(CF_3CH_2OSO_2)_3C-$.

In addition, examples of the cation include one, two, or more types of ions of alkali metals such as sodium, lithium, and potassium, ions of elements of Group 2 such as beryllium, magnesium, calcium, strontium, and barium, ions of transition elements, cations of amphoteric elements, auaternary ammonium ions, and imidazolium cations.

Regarding the ionic salt, a lithium salt using lithium ions as cations or a potassium salt using potassium ions as cations is particularly preferable.

Among these, in order to obtain effects of improving ion conductivity of the rubber composition and reducing the roller resistance value of the developing roller, $(CF_3SO_2)_2NLi$ [lithium bis(trifluoromethanesulfonyl)imide Li-TFSI], and/or $(CF_3SO_2)_2NK$ [potassium bis(trifluoromethanesulfonyl)imide, K-TFSI] are preferable.

The content of the ionic salt is preferably 0.5 parts by mass or more and preferably 5 parts by mass or less with respect to 100 parts by mass of the total amount of rubbers.

<Others>

Various additives may be additionally added to the rubber composition as necessary. Examples of the additive include a crosslinking promoting aid, an acid acceptor, a filling agent, a plasticizer, a processing aid, and a deterioration inhibitor.

Among these, examples of the crosslinking promoting aid include one, two, or more types of metal compounds such as zinc oxide (zinc white); fatty acids such as stearic acid, oleic acid, and cotton seed fatty acid, and a crosslinking promoting aid known in the related art.

Individually, the content of the crosslinking promoting aid is preferably 0.1 parts by mass or more and preferably 7 parts by mass or less with respect to 100 parts by mass of the total amount of rubbers.

The acid acceptor functions to prevent a chlorine-based gas generated from an epichlorohydrin rubber and the like during crosslinking from remaining in the roller main body, thereby preventing crosslinking inhibition and contamination and the like of the photoreceptor.

Regarding the acid acceptor, various substances acting as an acid acceptor can be used. Among these, hydrotalcites or magsarat having excellent dispersibility is preferable, and hydrotalcites are particularly preferable.

In addition, when hydrotalcites or the like and magnesium oxide or potassium oxide are used in combination, it is possible to obtain a stronger acid acceptor effect and it is possible to prevent contamination of the photoreceptor and the like more reliably.

The content of the acid acceptor is preferably 0.2 parts by mass or more, particularly 0.5 parts by mass or more, and preferably 7 parts by mass or less with respect to 100 parts by mass of the total amount of rubbers.

Regarding the filling agent, for example, one, two, or more types of zinc oxide, silica, carbon black, talc, calcium carbonate, magnesium carbonate, aluminum hydroxide, and the like may be used.

When the filling agent is added, it is possible to improve mechanical strength and the like of the roller main body.

In addition, when conductive carbon black is used as the filling agent, electron conductivity can be imparted to the roller main body.

Regarding the conductive carbon black, for example, acetylene black and the like may be used.

The content of the conductive carbon black is preferably 1 part by mass or more and preferably 7 parts by mass or less with respect to 100 parts by mass of the total amount of rubbers.

Examples of the plasticizer include various plasticizers such as dibutyl phthalate, dioctyl phthalate, and tricresyl phosphate, and various waxes such as polar wax.

In addition, examples of the processing aid include fatty acid metal salts such as zinc stearate.

The content of the plasticizer and/or processing aid is preferably 3 parts by mass or less with respect to 100 parts by mass of the total amount of rubbers.

Regarding the deterioration inhibitor, various antioxidants and oxidation inhibitors and the like may be exemplified.

Among these, the antioxidant reduces environmental dependency of the roller resistance value of the developing roller and minimizes an increase in the roller resistance value during continuous charging.

Examples of the antioxidant include nickel diethyl dithiocarbamate, and nickel dibutyldithiocarbamate.

The content of the antioxidant is preferably 0.1 parts by mass or more and preferably 1 part by mass or less with respect to 100 parts by mass of the total amount of rubbers.

In addition, regarding the additive, various additives such as a scorching inhibitor, a lubricant, a pigment, an antistatic agent, a flame retardant, a neutralizing agent, a nucleating agent, and a co-crosslinking agent may be additionally added in an arbitrary proportion.

Here, in the embodiment of FIGS. 1A and 1B, the roller main body 2 has, for example, a single-layer structure formed of the rubber composition including the above components. However, the roller main body 2 may have, for example, a structure in which two or more layers are laminated.

In addition, the roller main body is not limited to that formed of the rubber composition.

For example, it is possible to form a roller main body formed of various elastic materials that satisfy the following requirements:
- a suitable roller resistance value can be provided for the developing roller,
- it is possible to form a roller main body having excellent mechanical strength, durability, and the like, and
- it is possible to impart characteristics in which it is flexible, a compression set is small, and deformation is unlikely to occur to the roller main body.

Examples of elastic materials other than the rubber composition, which satisfy the above requirements, include a thermoplastic elastomer and a soft resin.

When any of the elastic materials is used, it is possible to obtain a developing roller in which the outer circumferential surface of the roller main body is formed into a specific surface shape described above, and even if image formation is repeated, since a toner transportation amount does not decrease greatly, there are no risks of the image density of formed images rapidly decreasing and the occurrence of an uneven density.

The developing roller of the disclosure can be incorporated into, for example, various image forming devices using electrophotography such as a laser printer, an electrostatic copying machine, a plain paper facsimile machine, and a multifunctional machine thereof and used.

EXAMPLES

The disclosure will be described below in detail based on examples and comparative examples. However, the configuration of the disclosure is not necessarily limited to these examples and comparative examples.

Example 1

(Preparation of Rubber Composition)

Regarding the rubber, 15 parts by mass of ECO [Epichromer (registered trademark, commercially available from Osaka Soda Co., Ltd.) D, EO/EP=61/39 (molar ratio)], 45 parts by mass of GECO [Epion (registered trademark, commercially available from Osaka Soda Co., Ltd.) 301 (low vis type), EO/EP/AGE=73/23/4 (molar ratio)], 10 parts by mass of CR [Shoprene (registered trademark, commercially available from Showa Denko K.K.) WRT, non-oil extended], and 30 parts by mass of NBR [JSR N250 SL commercially available from JSR, low nitrile NBR, content of acrylonitrile: 20%, non-oil extended] were added.

Then, while masticating 100 parts by mass of the total amount of the above four types of rubbers using a Banbury mixer, the following components were added and kneaded.

TABLE 1

| Component | Parts by mass |
| --- | --- |
| Ionic salt | 3.40 |
| Crosslinking promoting aid | 5.00 |
| Acid acceptor | 5.00 |
| Filling agent | 2.00 |
| Processing aid | 1.00 |
| Antioxidant | 0.50 |

The components in Table 1 are as follows. In addition, the parts by mass in the table are parts by mass with respect to 100 parts by mass of the total amount of rubbers.

Ionic salt: potassium bis(trifluoromethanesulfonyl)imide [EF-N112, K-TFSI commercially available from Mitsubishi Material Electronic Chemicals Co., Ltd.]

Crosslinking promoting aid: two types of zinc oxide [commercially available from Sakai Chemical Industry Co., Ltd.]

Acid acceptor: hydrotalcites [DHT-4A (registered trademark, commercially available from Kyowa Chemical Industry Co., Ltd.)-2]

Filling agent: conductive carbon black [Denka Black (registered trademark, commercially available from Denka Co., Ltd.) acetylene black, granular form]

Processing aid: zinc stearate [SZ-2000 commercially available from Sakai Chemical Industry Co., Ltd.]

Antioxidant: nickel dibutyldithiocarbamate [Nocrac (registered trademark, commercially available from Ouchi Shinko Chemical Industry) NBC]

Next, while kneading was continued, the following crosslinking components were added and kneading was additionally performed to prepare a rubber composition.

TABLE 2

| Component | Parts by mass |
| --- | --- |
| Dispersible sulfur | 1.50 |
| Promoter TS | 0.50 |
| Promoter DM | 1.50 |
| Thiourea-based crosslinking agent | 0.60 |
| Promoter DT | 0.54 |

Components in Table 2 are as follows. In addition, the parts by mass in the table are parts by mass with respect to 100 parts by mass of the total amount of rubbers.

Dispersible sulfur: crosslinking agent [product name Sulfax PS (commercially available from Tsurumi Chemical Industry Co., Ltd.), sulfur content: 99.5%] Promoter TS: tetramethylthiuram monosulfide [Sanceler (registered trademark, commercially available from Sanshin Chemical Industry Co., Ltd.) TS, thiuram-based promoter] Promoter DM: di-2-benzothiazolyl disulfide [Nocceler (registered trademark, commercially available from Ouchi Shinko Chemical Industry) DM, thiazole-based promoter] Thiourea-based crosslinking agent: ethylene thiourea [Accelerator (registered trademark, commercially available from Kawaguchi Chemical Industry Co., Ltd.) 22-S, 2-mercaptoimidazoline] Promoter DT: 1,3-di-o-tolylguanidine [Sanceler DT (commercially available from Sanshin Chemical Industry Co., Ltd.), guanidine-based promoter]

(Production of Developing Roller)

The following processes were performed to produce a developing roller.

Molding to Polishing Processes

The prepared rubber composition was supplied to an extruder, and extruded and molded into a cylindrical shape with an outer diameter of φ18.0 mm and an inner diameter of φ7.0 mm, cut, and attached to a temporary shaft for crosslinking, and crosslinked in a vulcanizer at 160° C. for 1 hour.

Next, the crosslinked cylindrical component was re-attached to a metal shaft having an outer circumferential surface to which a conductive thermosetting adhesive (polyamide type) was applied and an outer diameter of φ7.5 mm was heated in an oven at 160° C. and bonded to the metal shaft.

Then, both ends of the cylindrical component was shaped, and the outer circumferential surface was then dried and polished using a wide polishing machine so that the outer diameter become φ16.0 mm.

Laser Processing Process to Wiping Process

The polished outer circumferential surface was wiped with an alcohol, and then subjected to laser processing using a laser processing machine [fiber laser processing machine ML-7320DL commercially available from Amada Miyache Co., Ltd.], and the outer circumferential surface had a surface shape in which a plurality of recesses were disposed in a matrix form in the circumferential direction and the axial direction.

The recesses were disposed so that the pitch $P_A$ between adjacent recesses in the axial direction was 55 μm, the pitch $P_C$ in the circumferential direction was 40 μm, and thus the ratio $P_A/P_C$ was 1.38.

Then, the outer circumferential surface after laser processing was wiped with an alcohol again, and then set in a UV treatment device in which a distance from a UV light source to the outer circumferential surface was set to 50 mm, and ultraviolet rays were emitted for 15 minutes while rotating at 300 rpm, an oxide film was formed to produce a developing roller.

Figure 3:
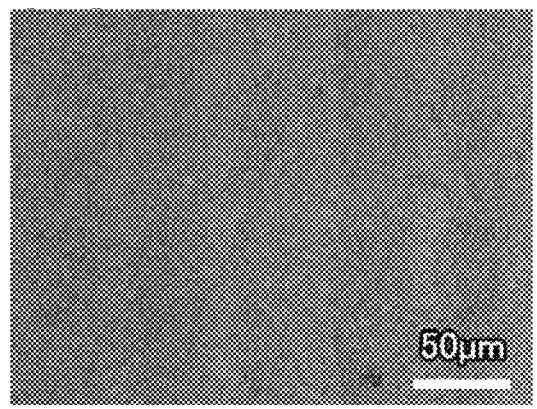
FIG. 3 is a stereomicroscope image showing an enlarged part of the outer circumferential surface of a roller main body of a developing roller of Example 1 according to the disclosure.

The outer circumferential surface of the produced developing roller is shown in FIG. 3.

Example 2

A developing roller was produced in the same manner as in Example 1 except that recesses were disposed so that the pitch $P_A$ between adjacent recesses in the axial direction was 50 μm, the pitch $P_C$ in the circumferential direction was 35 μm, and the ratio $P_A/P_C$ was 1.43.

Figure 4:
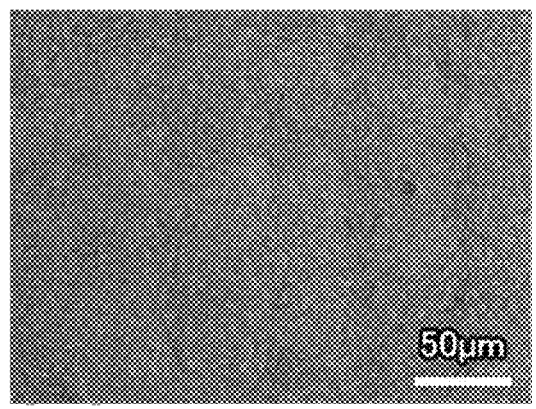
FIG. 4 is a stereomicroscope image showing an enlarged part of an outer circumferential surface of a roller main body of a developing roller of Example 2.

The outer circumferential surface of the produced developing roller is shown in FIG. 4.

Comparative Example 1

A developing roller was produced in the same manner as in Example 1 except that recesses were disposed so that the pitch $P_A$ between adjacent recesses in the axial direction was 55 μm, the pitch $P_C$ in the circumferential direction was 50 μm, and the ratio $P_A/P_C$ was 1.10.

Figure 5:
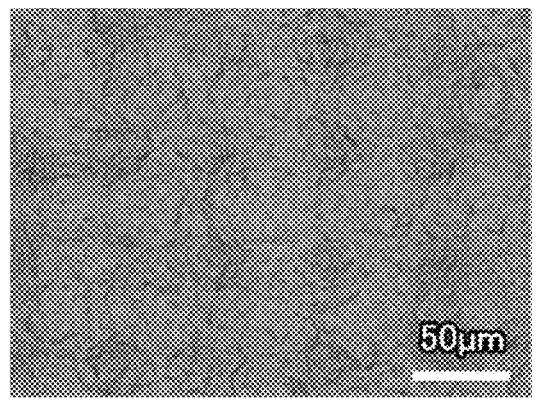
FIG. 5 is a stereomicroscope image showing an enlarged part of an outer circumferential surface of a roller main body of a developing roller of Comparative Example 1.

The outer circumferential surface of the produced developing roller is shown in FIG. 5.

Comparative Example 2

A developing roller was produced in the same manner as in Example 1 except that recesses were disposed so that the pitch $P_A$ between adjacent recesses in the axial direction was 5 μm, the pitch $P_C$ in the circumferential direction was 55 μm, and the ratio $P_A/P_C$ was 0.09.

Figure 6:
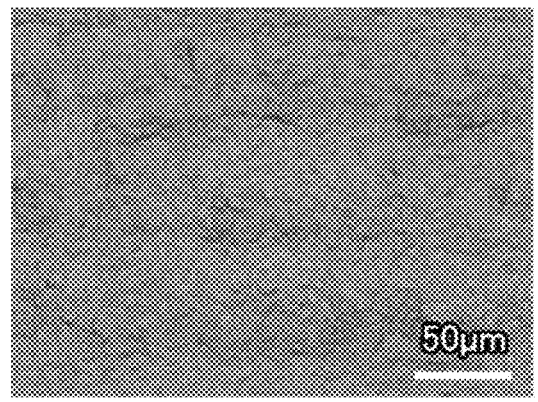
FIG. 6 is a stereomicroscope image showing an enlarged part of an outer circumferential surface of a roller main body of a developing roller of Comparative Example 2.

The outer circumferential surface of the produced developing roller is shown in FIG. 6.

<Actual Machine Test>

In place of a genuine developing roller of a new black toner cartridge which includes a toner container in which a toner is accommodated, a photoreceptor, and a developing roller in contact with the photoreceptor, and is detachable from a main body of a color laser printer, the developing rollers produced in the example and the comparative examples were incorporated.

Next, the assembled cartridge was loaded in a color laser printer [HL-L8350CDW commercially available from Brother Industries, Ltd.], and one white solid image (white paper) was formed and the cartridge was then removed.

Then, the toner was sucked from the outer circumferential surface of the developing roller incorporated into the cartridge, using a suction type small charge amount measurement device [MODEL 212HS commercially available from Trek Japan Co., Ltd.], and a toner transportation amount $W_0$ per unit area was obtained from the sucked toner mass and the area.

Next, the toner cartridge was loaded again in the color laser printer, 1,000 images with a density of 1% were continuously formed, and one white solid image was then formed again, and a toner transportation amount $W_{1000}$ per unit area was measured in the same manner as above.

Then, according to Formula (3):

$$R_W = W_{1000}/W_0 \times 100 \qquad (3),$$

a retention rate $R_W$ (%) of the toner transportation amount was obtained, and a degree of decrease in the toner transportation amount when image formation is repeated was evaluated according to the following criteria.

○: The retention rate $R_W$ was 80% or more. A decrease in the transportation amount was small, favorable.

x: The retention rate $R_W$ was less than 80%. A decrease in the transportation amount was large, poor.

<Evaluation of Image Quality>

After 1,000 images with a density of 1% were continuously formed in the actual machine test, a black solid or halftone image was formed and visually observed, and the image quality after image formation was repeated was evaluated according to the following criteria.

○: Neither density decrease nor uneven density was observed in the formed images. Favorable image quality.

x: Density decrease or uneven density was observed in the formed images. Poor image quality.

The above results are shown in Table 3.

TABLE 3

| | | | Example 1 | Example 2 | Comparative Example 1 | Comparative Example 2 |
|---|---|---|---|---|---|---|
| Pitch (μm) | | Axial direction $P_A$ | 55 | 50 | 55 | 5 |
| | | Circumferential direction $P_C$ | 40 | 35 | 50 | 55 |
| Ratio $P_A/P_C$ | | | 1.38 | 1.43 | 1.10 | 0.09 |
| Result | Toner transportation amount | Retention rate (%) | 96.2 | 87.7 | 68.5 | 61.7 |
| | | Evaluation | ○ | ○ | x | x |
| | Image quality | | ○ | ○ | x | x |

Based on the results of Examples 1 and 2 and Comparative Examples 1 and 2 in Table 3, it was found that, when a plurality of recesses were disposed on the outer circumferential surface of the roller main body so that the ratio $P_A/P_C$ of the pitch $P_A$ in the axial direction on the outer circumferential surface to the pitch $P_C$ in the circumferential direction was set to a range exceeding 1.1, since the toner transportation amount did not decrease greatly even if image formation was repeated, it was possible to obtain a developing roller having no risks of the image density of the formed images rapidly decreasing and the occurrence of an uneven density.

In addition, based on the results Examples 1 and 2, it was found that, in order to further improve the above effects, the ratio $P_A/P_C$ was preferably 1.2 or more, particularly 1.3 or more, and preferably 1.6 or less, particularly 1.5 or less, within the above range.

What is claimed is:

1. A developing roller comprising a roller main body, wherein, on an outer circumferential surface of the roller main body, a plurality of recesses that are disposed at predetermined pitches in a circumferential direction and an axial direction in the outer circumferential surface are provided, and a pitch $P_A$ between the plurality of recesses in the axial direction and a pitch $P_C$ between the plurality of recesses in the circumferential direction satisfy Formula (1):

$$P_A/P_C > 1.1 \qquad (1).$$

2. The developing roller according to claim 1, wherein at least the outer circumferential surface of the roller main body is constituted by rubber, and has an oxide film.

3. A method of producing the developing roller according to claim 2, comprising
   a process of forming the plurality of recesses on the outer circumferential surface of the roller main body by laser processing.

4. The method of producing the developing roller according to claim 3, comprising
   a process of forming the oxide film by emitting ultraviolet rays in an oxidizing atmosphere to the outer circumferential surface after the plurality of recesses are formed.

5. A method of producing the developing roller according to claim 1, comprising
   a process of forming the plurality of recesses on the outer circumferential surface of the roller main body by laser processing.

* * * * *